(12) United States Patent
Yang

(10) Patent No.: US 10,540,386 B2
(45) Date of Patent: Jan. 21, 2020

(54) METHOD FOR PROCESSING AND DISPLAYING REAL-TIME SOCIAL DATA ON MAP

(71) Applicant: Shaofeng Yang, Brambleton, VA (US)

(72) Inventor: Shaofeng Yang, Brambleton, VA (US)

( * ) Notice: Subject to any disclaimer, the term of this patent is extended or adjusted under 35 U.S.C. 154(b) by 567 days.

(21) Appl. No.: 14/910,287

(22) PCT Filed: Aug. 11, 2014

(86) PCT No.: PCT/US2014/050492
§ 371 (c)(1),
(2) Date: Feb. 5, 2016

(87) PCT Pub. No.: WO2015/021459
PCT Pub. Date: Feb. 12, 2015

(65) Prior Publication Data
US 2016/0179823 A1 Jun. 23, 2016

Related U.S. Application Data

(60) Provisional application No. 61/864,243, filed on Aug. 9, 2013.

(51) Int. Cl.
*G06F 16/44* (2019.01)
*G06N 20/00* (2019.01)
(Continued)

(52) U.S. Cl.
CPC ........ *G06F 16/444* (2019.01); *G06F 3/04812* (2013.01); *G06F 16/287* (2019.01); *G06F 16/29* (2019.01); *G06N 20/00* (2019.01)

(58) Field of Classification Search
CPC .......... G06F 17/30563; G06F 3/04812; G06F 17/30061; G06F 17/30241; G06F 17/30601; G06Q 50/01; G06N 99/005
(Continued)

(56) References Cited

U.S. PATENT DOCUMENTS 6,377,210 B1 * 4/2002 Moore ................... G01C 21/26
342/357.4
7,146,416 B1 * 12/2006 Yoo ..................... G06F 16/9535
709/224
(Continued)

FOREIGN PATENT DOCUMENTS

JP 2002-333337 11/2002
JP 2006139412 A 6/2006
(Continued)

OTHER PUBLICATIONS

Jan. 25, 2017, European Search Report and Opinion as to 14835297.4—1952/303976 PCT/US2014/050492.
(Continued)

*Primary Examiner* — Ryan F Pitaro
(74) *Attorney, Agent, or Firm* — Mei & Mark LLP

(57) ABSTRACT

Social data obtained from social networks first undergo preliminary processing to remove the social data that do not have a workable attribute. Next, the social data go through machine learning process and stored firstly in a cache of main server and later on in a big data database that is distributed into different servers at different locations, with the purpose of better security and efficiency. When a client requests or search a certain attribute, such as location, the well processed and organized social data stored in the cache and the big data database will be searched in order to find the corresponding social data, which will then be present at a map based on such social data's location attribute. The foregoing process can be implemented as an application of a handheld device, such as cell phone, or a website that is accessible for both handheld device and computer.

15 Claims, 3 Drawing Sheets

- Topic:
    - Party (10)
    - Birthday (5) (10:05 AM)
    - Meeting (5) (10:00 AM)
- People:
- Picture:

(51) Int. Cl.
*G06F 16/29* (2019.01)
*G06F 16/28* (2019.01)
*G06F 3/0481* (2013.01)

(58) Field of Classification Search
USPC ........................................................ 715/764
See application file for complete search history.

(56) References Cited

U.S. PATENT DOCUMENTS

| | | | | |
|---|---|---|---|---|
| 8,122,031 | B1* | 2/2012 | Mauro | G06F 16/355 |
| | | | | 707/748 |
| 2007/0214097 | A1* | 9/2007 | Parsons | G06Q 10/00 |
| | | | | 706/12 |
| 2007/0218900 | A1* | 9/2007 | Abhyanker | G06Q 10/087 |
| | | | | 455/435.1 |
| 2007/0281689 | A1* | 12/2007 | Altman | G06Q 30/0207 |
| | | | | 455/435.1 |
| 2007/0281690 | A1* | 12/2007 | Altman | H04W 4/185 |
| | | | | 455/435.1 |
| 2009/0070168 | A1* | 3/2009 | Thompson | G06Q 10/10 |
| | | | | 705/412 |
| 2009/0171939 | A1* | 7/2009 | Athsani | G06F 16/29 |
| 2010/0076968 | A1* | 3/2010 | Boyns | H04W 4/21 |
| | | | | 707/732 |
| 2010/0106801 | A1* | 4/2010 | Bliss | G01C 21/00 |
| | | | | 709/219 |
| 2010/0145947 | A1* | 6/2010 | Kolman | H04W 4/02 |
| | | | | 707/736 |
| 2010/0306249 | A1* | 12/2010 | Hill | G06Q 30/02 |
| | | | | 707/769 |
| 2011/0040760 | A1* | 2/2011 | Fleischman | G06Q 30/02 |
| | | | | 707/737 |
| 2011/0179161 | A1* | 7/2011 | Guy | G06Q 10/10 |
| | | | | 709/224 |
| 2011/0252031 | A1* | 10/2011 | Blumenthal | G06Q 30/02 |
| | | | | 707/733 |
| 2012/0034929 | A1* | 2/2012 | Ozer | G01S 19/13 |
| | | | | 455/456.1 |
| 2012/0130940 | A1* | 5/2012 | Gattani | G06Q 30/0631 |
| | | | | 707/600 |
| 2012/0215903 | A1* | 8/2012 | Fleischman | G06Q 30/0201 |
| | | | | 709/224 |
| 2013/0073336 | A1* | 3/2013 | Heath | G06Q 30/02 |
| | | | | 705/7.29 |
| 2013/0073388 | A1* | 3/2013 | Heath | G06Q 50/01 |
| | | | | 705/14.53 |
| 2013/0073473 | A1* | 3/2013 | Heath | G06Q 30/02 |
| | | | | 705/319 |
| 2013/0110927 | A1* | 5/2013 | Marra | G06Q 50/01 |
| | | | | 709/204 |
| 2014/0012938 | A1* | 1/2014 | Ghandeharizadeh | ......... |
| | | | | H04L 67/2852 |
| | | | | 709/213 |
| 2014/0258260 | A1* | 9/2014 | Rayborn | G06F 16/951 |
| | | | | 707/707 |
| 2015/0025977 | A1* | 1/2015 | Doyle | G06Q 50/01 |
| | | | | 705/14.66 |

FOREIGN PATENT DOCUMENTS

| | | | | |
|---|---|---|---|---|
| JP | | 2008-292511 | 12/2008 | |
| JP | | 2009099148 A | 5/2009 | |
| JP | | 2010-054484 | 3/2010 | |
| WO | WO 2011/100307 A1 | | 8/2011 | |
| WO | WO 2011100307 A1 | * | 8/2011 | ......... G01C 21/3679 |

OTHER PUBLICATIONS

Jan. 15, 2015, Written Opinion of the International Searching Authority as to PCT/US2014/050492.
Jul. 5, 2019 (mailed), Second Office Action in corresponding Japanese Patent Application No. 2016-533489.
Feb. 13, 2018, SIPO Office Action in Chinese Patent App. 201480044174.6 (rejecting claims over US Patent App. Pub. No. 20130110927 and WO 2011/100307—both references previously acknowledged by Examiner Orr on Jan. 15, 2018).
Jul. 30, 2018, Office Action in corresponding Japanese Patent Application.

* cited by examiner

- Topic:
  - Party (10)
  - Meeting (6)
  - Birthday(4)
- People:
- Picture:

Figure 3A

- Topic:
  - Party (10)
  - Birthday (5) (10:05 AM)
  - Meeting (5) (10:00 AM)
- People:
- Picture:

Figure 3B

- Topic:
  - Meeting (6)
  - Birthday (5)
- People:
  - Obama (X + 1)
- Picture:

Figure 3C

METHOD FOR PROCESSING AND DISPLAYING REAL-TIME SOCIAL DATA ON MAP

The current application claims a priority to the U.S. Provisional Patent Application Ser. No. 61/864,243, filed on Aug. 9, 2013. The Aug. 9, 2014 was on a weekend and the current application is filed on the next business day Aug. 11, 2014.

FIELD OF THE INVENTION

The present invention relates generally to a method for processing and displaying social data. More specifically, it relates to a method for processing and displaying social data on geographic map based on respective attributes including location and in a real-time manner.

BACKGROUND OF THE INVENTION

Online social networking emerges as an important part of people's social life and meanwhile, it has generated huge amount of valuable social data. Most of the online social activities are performed via the social network service (website/smart phone apps). A social networking service is a platform to build social networks or social relations among people who, for example, share interests, activities, backgrounds, or other connections. A social network service comprises the representation of each user (such as the profile), the social links, and a variety of additional services. Most social network services are web-based and provide means for users to interact over the Internet, such as e-mail, instant messaging and the like. The online community services are considered sometimes as a social network service, although online community services are group-orientated. Social networking service allows users to share ideas, pictures, posts, activities, events, and interests with people in their respective network. During these activities, many valuable social data have been generated.

The social networking services make it possible to connect people who share interests and activities across political, economic, and geographic borders; and the generated data are very informative and valuable for both individuals and businesses. However, so far the generated huge quality social data have not been fully and effectively exploited. With appropriate collection, sorting and analysis; such social information will be greatly helpful in a wide variety areas of people's life and work. On the other hand, via the collecting, sorting and analysis, a lot of potential valuable business information could be obtained from the social data. In view of these huge potentials, the accumulated social data could be a goldmine waiting for the exploration by those visionaries. Through such data mining, companies are able to improve their sales and profitability or expand their clientele basis.

Social network service, represented by Facebook and Twitter, becomes a significant part of many people's life. Each day, a huge amount of information has been generated on these social networks via user posting and so on. Furthermore, there are very valuable and useful information, such as tread or popularity, hidden in such huge amount of postings. Such valuable information is highly desirable for many businesses or organizations. However, due to the huge quantity and great diversity of such social network information, it is critical for developing certain approaches to analyze and present it in an effective way.

On the other hand, following the emergence of iPhone and other smart phones, people are increasingly using handheld devices, such as smart phone and tablet device other than the traditional PC, and in particular, via the applications (apps) installed in such handheld device to visit the social networks.

As for the utilization of social data, one of the key issues is to find the appropriate attribute whereby those sorting and analysis could be performed. Currently, the forefront of emerging trends in social networking sites is the concept of "real-time" and "location-based". Real-time allows users to contribute contents, which is then broadcast, as it is being uploaded, on anywhere relevant online. The concept is analogous to live radio and television broadcasts. One major social network website, Twitter, set the trend for "real-time" services, wherein users can broadcast to the world what they are doing, or what is on their minds within the 140 characters limit. While Twitter focuses on words, Clixtr, another real-time service, focuses on group photo sharing wherein users can update their photo streams with photos while at an event. Facebook, however, remains the largest photo sharing site. It has been estimated that Facebook has about 100 billion photos by 2012. On the other hand, more people and business have increasingly realized that concerning their values and importance, not all of the social data are equal. For most people, the social data at or close to their living or working locations are the ones have the most interest, importance, and value for them. Therefore, concerning the aforementioned appropriate attribute, the location feature would be one of the most suitable attributes for sorting, organization and analysis of social data. Moreover, other features associated with the social data, such as certain time period or time interval could also be very useful in some circumstances.

Concerning the accumulated social data, a large portion of these social data actually already have certain particular feature(s) or attribute(s) embedded in the content of that social data. Such embedding may take a variety of different forms. The social data might have trending hash-tags, mentions, pictures, videos and so on. Many social data have embedded location information in them. Utilizing these existing attribute tags would be an easy yet effectively approach to mining and then present the collected social data. These organized social data can help people reshape their social life and play a big role for marketing, security and so on, especially with the analysis of the combination of location, hash-tags, mentions, pictures, videos, and other social attributes. However, currently there is no a good solution to analyze the social data with embedded location and visualize it on the map in real-time.

Accordingly, one objective of the present invention is to provide an effective method to process the collected real-time social data based on certain specific attribute of the social data and then present the processed social data on a geographic map (social map) based on that particular attribute, such as a particular location. Moreover, in a more convenient and natural manner, these social data on the social map are arranged in various tiers, i.e., tiles at different levels.

BRIEF DESCRIPTION OF THE DRAWINGS

FIGS. 3A-3C depict examples of a description of processed social data that may be displayed on a client device.

DETAILED DESCRIPTION OF THE INVENTION

All illustrations of the drawings and descriptions of the embodiments are for the purpose of describing selected versions of the present invention and are not intended to limit the scope of the present invention.

The present invention is a process for displaying real time social data on a social map, which can be implemented on various platforms, such as mobile phone, tablet or other handheld devices, or computer. In addition, in order to implement this process, a close cooperation between the foregoing hardwire platform and main server or mains servers are necessary to implement the present invention. In this regard, the present invention is a specific process that needs the necessary functionalities from the foregoing mentioned hardwire. Moreover, such hardwire is usually not conventional computer, but mobile phones and specific servers. In addition to hardwire, the present invention also needs the wireless connections between the mobile device or the computer and a variety of servers.

In the present invention, the generated social map is an excellent approach to organize and analyze the social data and then display the received result on a geo-map in a real-time fashion. It leverages a high performance big data processing engine and a next generation map engine to create a dynamic (real-time) social map. At various geographical levels, it presents the real-time processed social data in a manner of map tiles.

Figure 1:
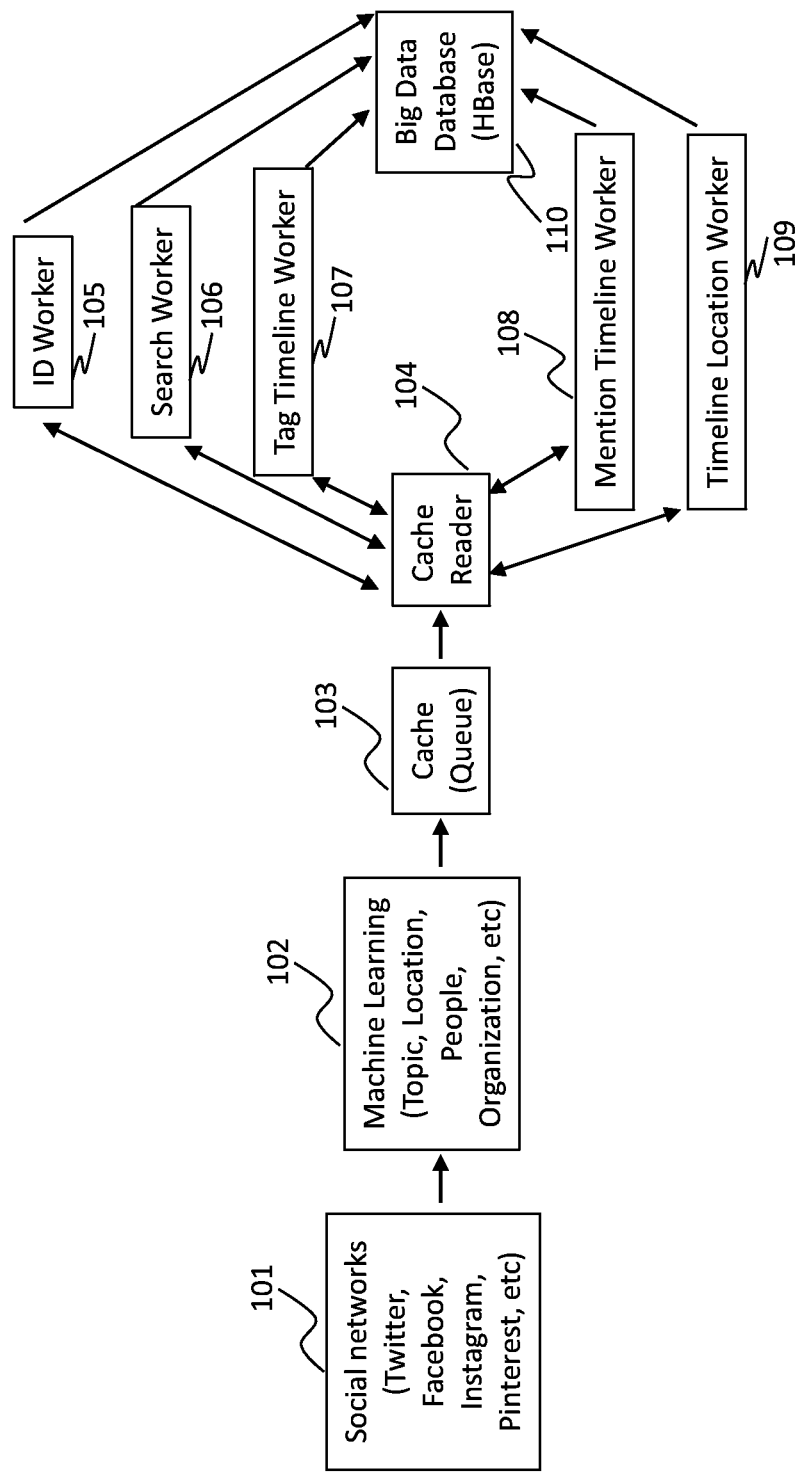
FIG. 1 depicts social data from social network is processed and stored in a big data database.

In reference to FIG. 1, the process the received social data being processed and stored in a database has been described. In the initial step for generating the real-time social map of the present invention, social data, especially those data with certain embedded information tag, such as the location and time information, are properly collected from major social network websites 101, such as Facebook, Twitter, Instagram, Pinterest, Myspace, Foursquare, and etc. In this way, the social map collects the live streams of social data, especially those with embedded location or other attributes that will be utilized later, from those major social networks.

In the present invention, the data has been received from twitter, as well as other social networks. As for the data mentioned here, they include, but are not limited to texts, sounds, pictures, video, any other form of postings, comments, replies and so on. After a connection has been established between a social network server and a main server of the present invention, the above mentioned social data would be automatically received in a real time mode. In a case when such connection is disrupted, a request will be sent to the social network server to reestablish the connection. In this way, the social data will be received automatically and continuously. So, the real time data or most updated data can are always available to be processed and then utilized in the present invention.

Next, the received data undergo a preliminary processing procedure. The main purpose of the preliminary processing is to filter out the received social data that contain no useful data, in a format that cannot be used in the present invention and so on. In addition, other types of social data, such as the social data with no location tag, or whose location information cannot be determined, will be removed. In addition, the social data with no date or time tag, or whose date or time information cannot be determined, will be removed, too. Since neither can be properly processed and then utilized in the present invention. Also, certain coarse and inconsistent social data are normalized as well to extract valid and consistent social data. Following the initial filtering process, the social data passed the primary processing will utilized in a machine learning process.

During the machine learning process 102, the data following the preliminary processing would be used along with known category characteristics to gradually establish the corresponding models for the category models. In the next step, the established category models will be used to categorize and analyze future data. In this context, the categories include, but are not limited to topic, location, people, organization and the like.

The data following machine learning process are next stored in the cache 103 of the main server, and arranged in a queue. The social data stored in the cache in the main server will be further analyzed by a plurality of different cache readers. The respective cache readers 104 function via certain ID worker 105, search worker 106, tag timeline worker 107, mention timeline worker 108, timeline location worker 109 and so on to analyze and further store then social data into a big data database 110 such as the Apache HBase. The HBase is an open source, non-relational, distributed database modeled after Google's BigTable and written in Java. It provides a fault-tolerant way of storing large quantities of sparse data (small amounts of information caught within a large collection of empty or unimportant data. In addition, HBase features compression, in-memory operation, and Bloom filters on a per-column basis as outlined in the original BigTable paper. Tables in HBase can serve as the input and output for MapReduce jobs run in Hadoop, and may be accessed through the Java API but also through REST, Avro or Thrift gateway APIs.

The foregoing process has been implemented by virtue of the real-time big data processing engine, and various tasks could be executed simultaneously with multi-processors. In other words, the process normally runs in a parallel fashion by virtue of multi-processors.

It is also noted that during the processing step, the social data will be processed and analyzed based on their respective location attributes and/or other appropriate attributes, such as the trending hash tag, mentions, pictures, videos, individual words, time period, and etc. The real-time big data processing engine will be employed in this particular procedure. Such processing work could be facilitated by certain cloud computing platforms, such as the Amazon EC2. A suitable computing platform should allow running the respective computer applications, and allow the scalable deployment of applications to create a virtual machine, which contains the software desired. During the processing approach, the geographical location would be controlled so as to ensure the latency optimization and high levels of redundancy.

The social data stored in the big data database are distributed among a plurality of different servers in different locations, with the purpose of reduce traffic and improve efficiency. This step is executed with certain software framework for storage and large-scale processing of data-sets on clusters of commodity hardware. In the present invention, Apache Hadoop has been utilized for such purpose. The Hadoop (High-availability distributed object-oriented platform) is an open-source software framework that supports data-intensive distributed applications, licensed under the Apache v2 license. It supports the running of applications on large clusters of commodity hardware. The Hadoop framework transparently provides both reliability and data motion to the applications. Hadoop implements a computational paradigm named MapReduce, where the application is divided into many small fragments of work, each of which may be executed or re-executed on any node in the cluster. The Amazon Elastic MapReduce (EMR) would be a good example in this context. It is fault tolerant for slave failures, and it is quite suitable to only run the Task Instance Group on spot instances to take advantage of the lower cost while maintaining availability.

In order to facilitate a quick and efficient presentation of the social data on a geo-map when an individual client (a client is an application or program installed in a handheld device or a computer) makes a request via either a handheld device such as cell phone, or a computer, the social data stored in the big data database, such as HBase, are already processed and sorted based on certain criteria. Moreover, whenever a piece of new social data has been received from a social network, following the above mentioned preliminary processing and processing procedures, it will be further sorted right after finally saved into the big data database. In this way, whenever a client makes a request for certain category of social data, that category of social data would be already available or almost available from the database. As a result, the user experience of the present invention would be significantly improved.

More specifically, right after a new social data is saved in the big data database as described above, via the previously mentioned preliminary, machine learning and further processing procedures, the attributes included in this new social data would be extracted, wherein the attributes comprises topic (the subject of the social data), location (the physical location of this social data's generator, which could be a cell phone), people (the people has been mentioned in this social data), picture (the image included in this social data, wherein the picture is represented by its uniform resource locator (URL)). It is noted that the attributes are not limited to the above mentioned categories; the present invention includes any suitable category, topic or criterion.

As previously mentioned, in the present invention, the social data would be presented in a geo-map, or a tile of a geo-map. Accordingly, the location attribute extracted from the new social data will be firstly utilized to find its tiles on different zoom level of the geo-map. Currently, a geo-map usually has twenty three zoom levels. That is to say, for each individual location on a geo-map, there are multiple (such as twenty three) geo-maps that would include such location, wherein these multiple geo-maps are of different scope and different resolution. For example, the location of U.S. Capitol would be in a geo-map that covers the Capitol Hill, a geo-map covers the Washington D.C. area, a geo-map covers the Virginia, DC and Maryland region, a geo-map covers U.S. east coast area . . . and so on. On the other hand, each geo-map has been divided into a plurality of different tiles. Based on the foregoing description, it would be know that for each location attribute, it would be included in multiple geo-map tiles. If there are total twenty three geo-map zoom levels, then for each individual location, it would be covered in twenty three geo-map tiles. For example, for the location of U.S. Capitol, it is covered in a tile of the geo-map of the Capitol Hill; it is also covered in a tile of the geo-map of the Washington D.C. area, and so on. It is also noted that the previously twenty three zoom level is just a conventional approach in the field. It is also possible that based on respective resolution of a geo-map, it may have less or more zoom levels, which are all covered within the scope of the present invention.

Furthermore, on each tile in each geo-map with respective zoom level, the attributes of the social data which have been categorized in this tile (according to their location attributes) will be counted and then sorted. For the attribute of topic, within a single tile, its social data may have many different topics and each topic has its own frequency (counts). For example, with reference to FIG. 3A, in one tile, its social data may have different topics, such as party, meeting, birthday, and so on, wherein the topic of party has been mentioned 10 times, the meeting has been mentioned 6 times and the topic of birthday has been mentioned 4 times. Accordingly, based on the above frequency (count) of each individual topic, these individual topics will be sorted. For example, the topic of party will be sorted to the top, meeting in the middle, and birthday at the end.

In summary, in each tile of a geo-map, there would be different attribute categories, such as topic, people, picture and so on. For each attribute category, there will be a sorting of individual attributes based on their respective count or frequency. Moreover, if two individual topics have the same frequency, for example, both the topic of meeting and the topic of birthday have the count of 5. In such a case, the individual topics with the same frequency within a tile will be sorted based on the time of its most recent counting. In the foregoing example, with reference to FIG. 3B, if the social data containing the last topic of meeting was received on 10:00 am, and the social data containing the last topic of birthday was received on 10:05 am of the same day, the topic of birthday would be sorted on top of meeting, because it is in the most recent social date that has been received.

Along with the geo-map and tile information, all of the above mentioned counting and sorting information have been stored in the servers that stores the big data database of the present invention. In one embodiment of the present invention, all of the above mentioned procedures are executed by a created co-processor.

Accordingly, the location attribute of a new social data will be utilized to categorize this new social data to the corresponding geo-map tiles on each geo-map zoom level. Next, based on the extracted new individual attributes of the attribute categories, such as topic, people and picture, the new social data will be added into counting of each corresponding individual categories. For example, with reference to FIG. 3C, if the new coming in social data has a location information, an individual topic of meeting, a mention of an individual person (such as Obama). Then in each tile that it belongs to according to its location information (there would be one tile at each zoom level this new social data beings to; accordingly if there are 23 zoom levels, then for each new social data, it would belong to at least total 23 tiles in different geo-maps), the corresponding individual category, meeting and Obama will be added for one more in their frequency, as for the meeting, it will be counted as 5+1, which is 6, and accordingly, now the topic of meeting would be sorted on top of birthday within the category of topic.

As mentioned above, whenever a new social data is coming in, the corresponding counts and sorting of the corresponding individual attribute will be updated accordingly. In this way, the social data stored in the big data database have been well prepared for a client's future request. As a result, a user of the client or device will have a desirable and smooth experience with the device that has employed the present invention.

In the entire process mentioned above, the social data received from social network have been processed and stored for future use.

Figure 2:
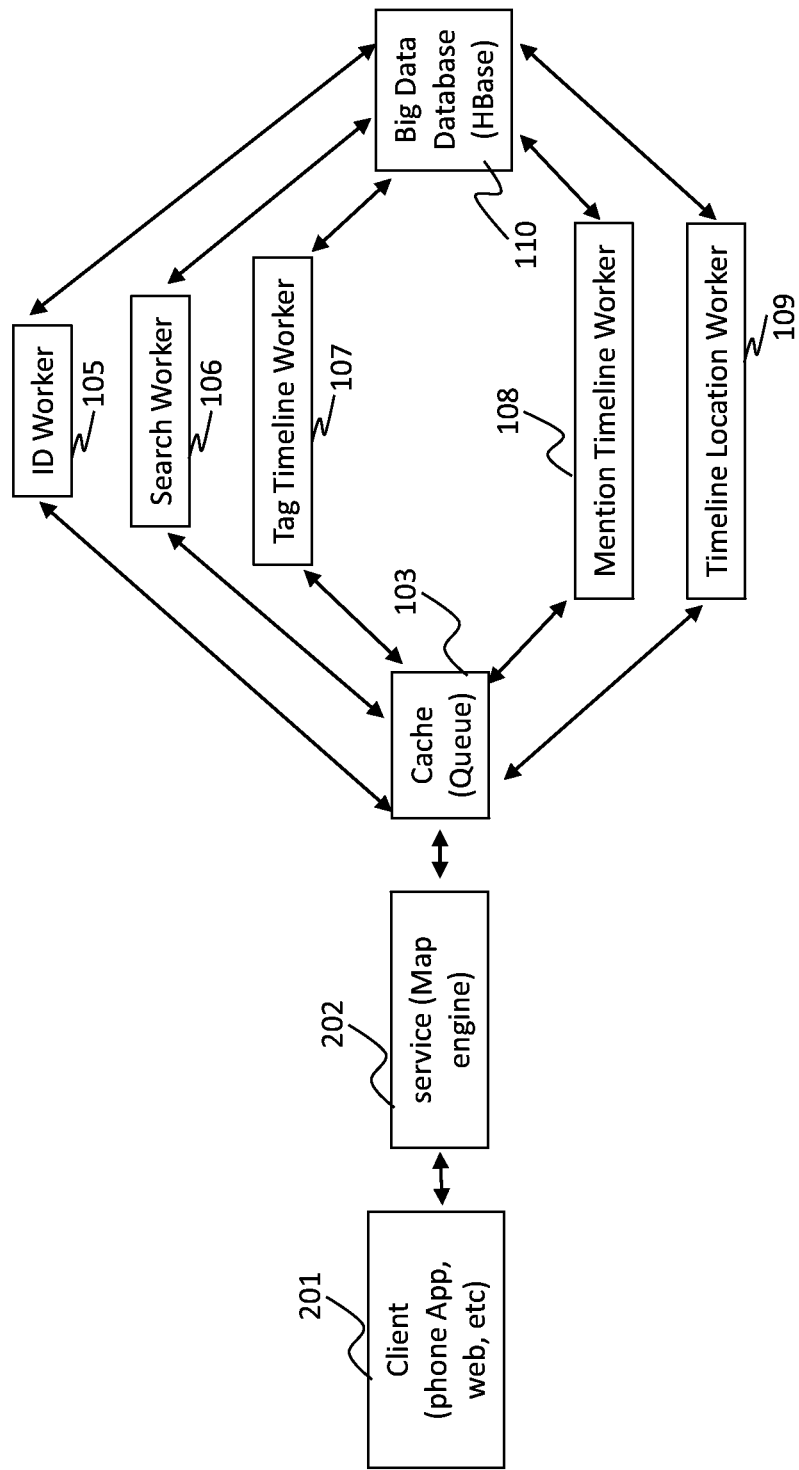
FIG. 2 depicts social data stored in the big data database is requested by a client and displayed on a computing device.

Moreover, in reference to FIG. 2, when a user is making a request via a client 201, where in the client can be either an application running on a handheld device, such as mobile phone, or a website that can be accesses by a computer. The request from a client will be first transferred to the to the application service that may be a map engine 202, which further makes a request to the main server. Following this process, the main service will firstly check its cache to obtain the corresponding processed social data stored in the cache of the main server. Further, the main server will make a request to the big data database, so as to obtain other corresponding processed social data from the big data database, which has been distributed and stored in a plurality of different servers on different locations.

Further, the obtained corresponding processed social data will be received by the client and displayed or played (sound data or video data) on the client. By virtue of the real-time map engine, the aggregated and processed social data for each tile will be displayed on the geographic map, so as to generate the social map disclosed in the present invention. For example, the tile may show the most popular social information (pictures, comments, reviews, tags, and etc) for a particular location. The tiles utilized in the social map of the present invention have a hierarchical structure, i.e., the tiles are organized in different tiers. When a user performs a zoom in, the current big tile will break down into multiple small lower level tiles. The highest level tile shows the most popular or most representative contents; while the tiles on a lower level next to it will show the organized most popular or most representative contents for those lower level individual tiles. Following the zoom in, one piece of tile will be broken into a plurality of subordinate tiles.

Moreover, as mentioned previously, the real-time capacity is the key feature of the social map disclosed in the present invention. Concerning the real-time feature of the present invention, it not only comprises the feature that all of the social data being collected, analyzed and displayed are the real-time social data; but also comprises the feature that when a particular social map is displayed for an individual user, during his/her watching time, if certain social information involved in the respective social map has been updated, then the social map will be immediately updated accordingly by means of pushing the updated data to the respective social map. So whenever the aggregated/processed social data changes, the related social map or specific tile of the social map will be updated in a real-time fashion.

In addition, the social map disclosed in the present invention allows users to search for specific social attribute to see its hot value of each tile on the social map, for example, @Starbucks. For each specific social attribute like trending hash tag, the social map also provides the capability to display all social information related to that social attribute based on the related map tiles, for example, all twits within certain map tile(s) containing the trending hash tag: @Starbucks. In this way, this real-time social map is capable of offering multiple convenient and useful functions to its users.

Although the present invention has been explained in relation to its preferred embodiments, it is understood that many other possible modifications and variations can be made without departing from the spirit and scope of the present invention.

What is claimed is:

1. A client device comprising a non-transitory computer readable storage medium storing a computer program, which when executed by a computer of the client device, performs the following steps: receiving a first input from a user; transmitting a request for social data based on the first input; receiving processed social data in response to the request, wherein the processed social data includes location attributes that correspond to physical locations of the processed social data's generators, respectively; and displaying a social map on the client device based on the processed social data, wherein: the social map comprises at least a first goo-map the of a first geographical area; the first geo-map tile is overlaid with a first description compiled from a first portion of the processed social data that includes a location attribute corresponding to the first geographical area; the first description comprises a first attribute category comprising a first listing of individual attributes and a corresponding numerical count for each of the individual attributes of the first listing; for each individual attribute of the first listing, its corresponding count identifies the frequency of the individual attribute in the first portion of the processed social data the first listing of individual attributes is sorted based upon the corresponding count of each of the individual attributes; and at least two individual attributes of the first listing of individual attributes have the same corresponding count and attributes are sorted in the first listing based on their respective recentness in the first portion of the processed social data.

2. The client device of claim 1, wherein the computer program, when executed by the computer, further performs the steps of:
    zooming in on the social map in response to a second input from the user.

3. The client device of claim 2, wherein the step of zooming in comprises:
    displaying at least a second geo-map tile of a second geographical area and a third geo-map tile of a third geographical area,
    wherein:
        the second and third geographical areas are located within the first geographical area;
        the second geo-map tile is overlaid with a second description compiled from a second portion of the processed social data that includes a location attribute corresponding to the second geographical area; and
        the third geo-map tile is overlaid with a third description compiled from a third portion of the processed social data that includes a location attribute corresponding to the third geographical area.

4. The client device of claim 1, wherein the computer program, when executed by the computer of the client device, further performs, after displaying the social map, the steps of:
    receiving updated processed social data in response to the request, wherein the updated processed social data includes location attributes; and
    redisplaying a social map on the client device based on the updated processed social data, wherein:
        the sorting of the first listing is updated to reflect the updated processed social data.

5. The client device of claim 1, wherein the first description further comprises:
    a second attribute category comprising a second listing of individual attributes; and
    a corresponding numerical count for each of the individual attributes of the second listing, wherein:
        for each individual attribute of the second listing, its corresponding count identifies the frequency of the individual attribute in the first portion of the processed social data.

6. The client device claim 1, wherein the first input is a hashtag or user identifier.

7. The client device claim 1, wherein:
the client device is a mobile phone or tablet; and
the computer program is an application running on the client device.

8. The non-transitory computer readable storage medium of claim 1, wherein the processed social data is additionally associated with a date or time tag or date or time information.

9. A method of displaying social data on a client device, comprising: receiving a first input from a user; transmitting a request for social data based on the first input; receiving processed social data in response to the request, wherein the processed social data includes location attributes that correspond to physical locations of the processed social data's generators, respectively; and displaying a social map on the client device based on the processed social data, wherein: the social map comprises at least a first geo-map the of a first geographical area; the first geo-map the is overlaid with a first description compiled from a first portion of the processed social data that includes a location attribute corresponding to the first geographical area; the first description comprises a first attribute category comprising a first listing of individual attributes and a corresponding numerical count for each of the Individual attributes of the first listing; for each individual attribute of the first listing, its corresponding count identifies the frequency of the individual attribute in the first portion of the processed social data the first listing of individual attributes is sorted based upon the corresponding count of each of the individual attributes; and at least two individual attributes of the first listing of individual attributes have the same corresponding count and are sorted in the first listing based on theft respective recentness in the first portion of the processed social data.

10. The method of claim 9, further comprising:
zooming in on the social map in response to a second input from the user.

11. The method of claim 10, wherein the step of zooming in comprises:
displaying at least a second geo-map tile of a second geographical area and a third geo-map tile of a third geographical area,
wherein:
the second and third geographical areas are located within the first geographical area;
the second geo-map tile is overlaid with a second description compiled from a second portion of the processed social data that includes a location attribute corresponding to the second geographical area; and
the third geo-map tile is overlaid with a third description compiled from a third portion of processed social data that includes a location attribute corresponding to the third geographical area.

12. The method of claim 9, further comprising, after displaying the social map:
receiving updated processed social data in response to the request, wherein the updated processed social data includes location attributes; and
redisplaying a social map on the client device based on the updated processed social data, wherein:
the sorting of the first listing is updated to reflect the updated processed social data.

13. The method of claim 9, wherein the first description further comprises:
a second attribute category comprising a second listing of individual attributes; and
a corresponding numerical count for each of the individual attributes of the second listing, wherein:
for each individual attribute of the second listing, its corresponding count identifies the frequency of the individual attribute in the first portion of the processed social data.

14. The method of claim 9, wherein the first input is a hashtag or user identifier.

15. The method of claim 9, wherein the processed social data is additionally associated with a date or time tag or date or time information.

* * * * *